April 10, 1956      H. P. PACINI      2,741,723
MAGNETIC DEFLECTION SWEEP AMPLIFIER
Filed Feb. 25, 1953
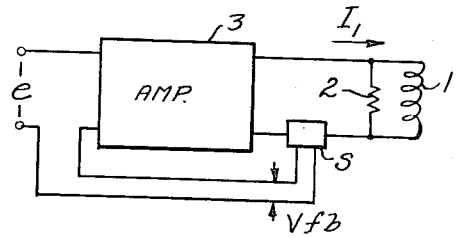
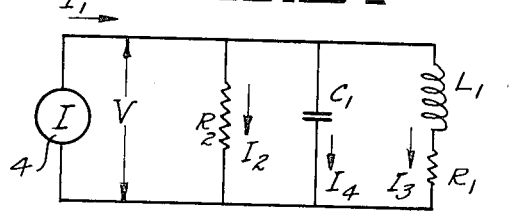
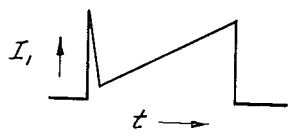
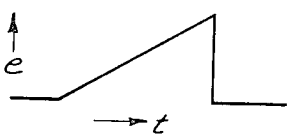
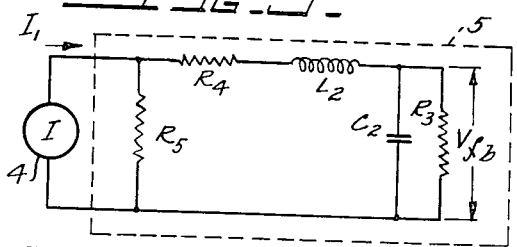
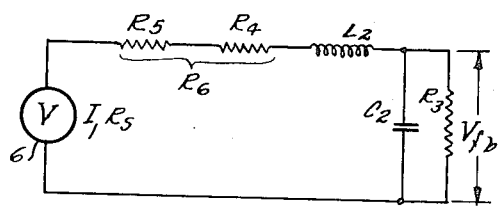
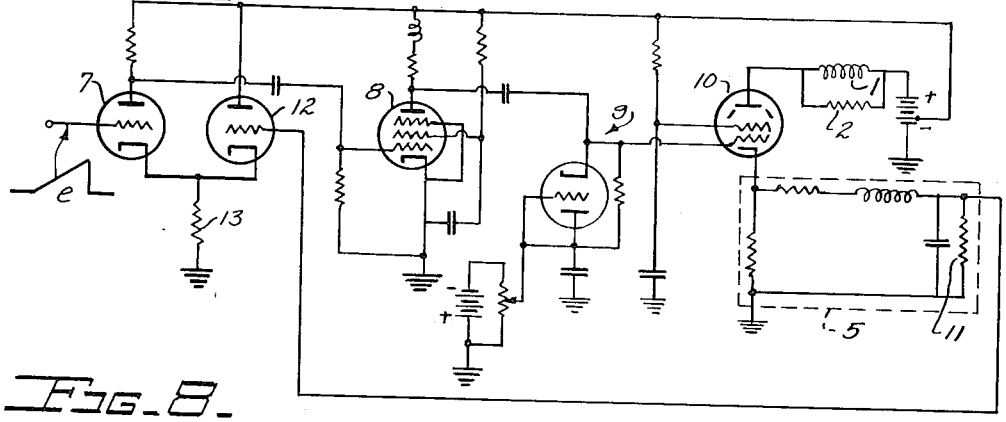
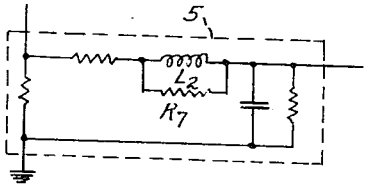
INVENTOR.
HUMBERT P. PACINI
BY James S. Shannon
AGENT
Wade Koontz
ATTORNEY 2,741,723
Patented Apr. 10, 1956

2,741,723
MAGNETIC DEFLECTION SWEEP AMPLIFIER

Humbert P. Pacini, Utica, N. Y.

Application February 25, 1953, Serial No. 338,931

6 Claims. (Cl. 315—27)

(Granted under Title 35, U. S. Code (1952), sec. 266)

The invention described herein may be manufactured and used by or for the United States Government for governmental purposes without payment to me of any royalty thereon.

This invention relates to sweep amplifiers for use in connection with cathode-ray tubes employing magnetic deflection of the electron beam, and is particularly concerned with the problem of obtaining linearity between the inductive current in the deflection coil and the sweep voltage applied to the input of the amplifier.

In the past sweep linearity has been obtained by a suitable preshaping of the sweep voltage applied to the sweep amplifier. It is the object of this invention to provide means for obtaining a linear sweep from a linear sawtooth sweep voltage without preshaping the sweep voltage.

The use of negative feedback to produce linearity between the input voltage and the current in an element in the output circuit of an amplifier is also known. This method requires that the negative feedback voltage be proportional to the current in the element, and in situations where the element is an inductance with appreciable distributed capacitance, as in the case of a deflection coil, this requirement poses a problem since the current flowing into and out of the terminals of the inductance contains also the current due to the distributed capacitance of the inductance, and, therefore, a voltage obtained from this current is not truly proportional to the inductive current. It is a further object of the invention to produce linearity between the inductive current in a deflection coil and the sweep signal applied to the sweep amplifier driving the coil by the use of negative feedback truly proportional to the current flowing through the deflection coil. This is accomplished by obtaining the feedback voltage from a circuit in the output of the sweep amplifier that is a dual of the equivalent circuit of the deflection coil.

The invention will be explained in more detail in connection with the accompanying drawings in which Fig. 1 shows schematically the general arrangement of a circuit in accordance with the invention;

Fig. 2 shows the equivalent circuit of yoke 1—2 in Fig. 1;

Fig. 3 shows the form of the current $I_1$ required to give current $I_3$ the form of a linear sawtooth;

Fig. 4 shows the form of the input voltage $e$ to the amplifier;

Fig. 5 shows the details of feedback network 5;

Fig. 6 shows the circuit of Fig. 5 with the current source changed to an equivalent voltage source; and Fig. 7 shows the details of a magnetic deflection sweep amplifier employing the invention;

Fig. 8 shows a modification of Fig. 7 for feedback phase control.

Referring to Fig. 1, a magnetic deflection yoke 1—2 for a cathode ray tube, consisting of deflection coil 1 and shunt resistance 2, is connected in the output circuit of amplifier 3. The equivalent circuit of the yoke is shown in Fig. 2 in which the resistance $R_2$ represents resistance 2, the capacitance $C_1$ represents the distributed capacity of coil 1, the inductance $L_1$ represents the inductance of coil 1, and the resistance $R_1$ represents the resistance of coil 1. In the equivalent circuit of the deflection yoke, the total current $I_1$ is the sum of currents $I_2$, $I_3$ and $I_4$. If it is desired to have $I_3$ in the inductive branch a linear sawtooth of current, the current $I_1$ must have approximately the form shown in Fig. 3, the impulse of current at the start being required to rapidly charge the capacitor $C_1$.

It is the object of the invention to provide a sweep circuit of the type shown in Fig. 1 in which a linear sawtooth of voltage $e$, as shown in Fig. 4, when applied to the input terminals of amplifier 3, will produce a corresponding linear sawtooth of current $I_3$ through the inductance $L_1$ of the deflection coil 1. This is accomplished by inserting a network 5 in the output circuit of amplifier 3 that is capable of producing from the current $I_1$ a voltage that is of the same form as the current $I_3$. This voltage is fed back degeneratively to the input of the amplifier and serves to oppose any departure of the wave form of current $I_3$ from that of voltage $e$.

The form of network 5 is shown in Fig. 5. If this network is subjected to the current $I_1$ the voltage $V_{fb}$ will have the same form as current $I_3$ in Fig. 2. This may be demonstrated as follows: The circuit of Fig. 6 is the equivalent of that in Fig. 5, the current source 4 and shunt resistor $R_5$ of Fig. 5 being replaced by the equivalent voltage source 6, producing a voltage equal to $I_1R_5$, and series resistance $R_5$ in Fig. 6. The circuit of Fig. 6 is a dual of that in Fig. 2. Two different networks are duals if they are representations of sets of integrodifferential equations of the same form. A discussion of dual networks may be found in the textbook "Transients in Linear Systems" by Gardner and Barnes, vol. 1, John Wiley & Sons, 1945. In dual networks, a voltage source is the dual of a current source, conductance is the dual of resistance, capacitance is the dual of inductance, and inverse inductance is the dual of elastance. Thus, in Figs. 2 and 6, voltage source 6 is the dual of current source 4, conductance $1/R_6$ is the dual of resistance $R_2$, inductance $L_2$ is the dual of capacitance $C_1$, capacitance $C_2$ is the dual of inductance $L_1$ and conductance $1/R_3$ is the dual of resistance $R_1$. Since Fig. 5 is the equivalent of Fig. 6 it follows that Fig. 5 is also a dual of Fig. 2. With reference to Fig. 2, the Laplace Transform Equations for a current $I_1$ into the driven network, assuming no energy storage at $t=0$, are:

(1) $$I_1(s) = \left(C_1 s + \frac{1}{R_2} + \frac{1}{L_1 s + R_1}\right) V(s)$$

(2) $$I_3(s) = \frac{V(s)}{L_1 s + R_1} = \frac{I_1(s)R_2}{R_2 C_1 s (L_1 s + R_1) + R_2 + L_1 s + R_1}$$
$$= \frac{I_1(s)R_2}{R_2 C_1 L_1 s^2 + (R_2 R_1 C_1 + L_1)s + R_1 + R_2}$$

In the circuit of Fig. 6:

(3) $$V_{fb}(s) = \frac{I_1(s) R_5 R_3}{R_3 C_2 L_2 s^2 + (R_3 R_6 C_2 + L_2)s + R_6 + R_3}$$

Therefore the form of $V_{fb}(s)$ is the same as that of $I_3(s)$ and if the voltage $V_{fb}(t)$ is used as the feedback voltage in a degenerative amplifier with a large amount of feedback (about 30 db), the voltage $V_{fb}$ will tend to be a replica of the input voltage $e$ to the amplifier, and the current $I_3$ in the inductive branch of the yoke will also be a replica, in shape and frequency response to the input voltage $e$. A discussion of equations of the above type may be found in the above-cited textbook.

A practical sweep amplifier employing the above method of obtaining linearity between the sweep signal and the inductive current through the deflection coil is shown in Fig. 7. A linear sawtooth voltage e is applied to the grid of amplifier tube 7. The output of this stage is further amplified by stage 8 and applied over clamping circuit 9 to the grid of power stage 10. The deflection yoke 1 is connected in the anode circuit of tube 10. The network 5, which is a dual of the equivalent network of yoke 1, is connected in the cathode circuit of tube 10. The feedback voltage, taken from across resistor 11, or in general, from a point in the dual network at which the voltage has the same form as the inductive current in the yoke, is applied to the grid of tube 12 and thence, by means of cathode resistor 13, to the input circuit of tube 7. As in all negative feedback amplifiers, the amplifier in this case must be designed with due regard to the phase shifts around the feedback loop in order to insure stability. In cases where instability is encountered the tendency toward oscillation may be reduced by the addition of resistance $R_7$ in shunt to inductance $L_2$ as shown in Fig. 8. The value of this resistance should be fairly high relative to the reactance of $L_2$.

The method described is not limited to use with magnetic deflection amplifiers, but may be employed for automatically forcing the current in any branch of a driven network to be of the same form as a signal voltage, regardless of what shape the signal may have. It is especially useful, as already pointed out, where it is not possible to connect to a particular part of the driven device to obtain a feedback voltage directly proportional to the current in that part. In any device in which a current in any branch of the equivalent circuit of the device is to be made a replica of an input signal voltage, the device may be placed in the anode of the output stage of an amplifier and a dual of the equivalent circuit of the device placed preferably in the cathode circuit of the output stage. A feedback voltage is obtained from a point in the dual network at which the voltage has the same form as the current through the desired branch of the equivalent circuit and is applied degeneratively to the input of the amplifier. The resulting negative feedback opposes any departure from linearity of the current in the desired branch with respect to the signal. The use of this method makes it unnecessary to design the device to respond in a particular fashion to a voltage at its input terminals, it only being necessary to find the equivalent circuit of the device, derive its dual, and connect the dual properly in the feedback loop of the amplifier. The necessity for preshaping the signal or for the use of equalizing networks is completely avoided. The driven device may be any device for which an electrical equivalent circuit may be derived, such, for example, as electromagnetic, electromechanical and electroacoustic devices.

I claim:

1. An amplifier, a load device connected in the output circuit of said amplifier, a network that is a dual of the equivalent circuit of said load device connected in series with said load device in the output circuit of said amplifier, and means for deriving a feedback voltage from said network and for applying said feedback voltage to the input circuit of said amplifier in degenerative phase.

2. An amplifier, a load device connected in the output circuit of said amplifier and having an equivalent electrical circuit with a plurality of branches, a network that is a dual of said equivalent circuit connected in series with said load device in the output circuit of said amplifier, and a negative feedback circuit connected between the input circuit of said amplifier and said network, said feedback circuit being connected to points in said network the voltage between which has the same form as the current in one of said branches.

3. A magnetic deflection sweep circuit comprising a sweep amplifier, a magnetic deflection coil assembly for a cathode-ray tube connected in the output circuit of said amplifier, a network that is a dual of the equivalent circuit of said coil assembly connected in series with said coil assembly in the output circuit of said amplifier, and a negative feedback circuit connected between the input circuit of said amplifier and said network, said feedback circuit being connected to points in said network the voltage between which has the same form as the inductive current in said equivalent circuit.

4. A magnetic deflection circuit for cathode-ray tubes comprising an amplifier; a magnetic deflection assembly comprising a deflection coil with distributed capacity and a resistance connected in shunt to said coil; means connecting said deflection yoke in the output circuit of said amplifier; a network that is a dual of the equivalent circuit of said assembly, said network comprising two parallel branches, one branch containing resistance only and the other branch containing resistance, inductance and a parallel combination of resistance and capacitance all connected in series; means connecting said network in the output circuit of said amplifier so that the current flowing through said yoke divides and passes through the two branches of said network; and means for applying the voltage across said parallel combination of resistance and capacitance in said network to the input of said amplifier in degenerative phase.

5. Apparatus as claimed in claim 4 in which said network is located in the cathode circuit of the final stage of said amplifier.

6. Apparatus as claimed in claim 4 in which a resistance having a value greater than the reactance of said inductance is connected in shunt to said inductance.

References Cited in the file of this patent

UNITED STATES PATENTS

| | | |
|---|---|---|
| 2,363,659 | Doba, Jr. | Nov. 28, 1944 |
| 2,412,210 | Edson et al. | Dec. 10, 1946 |
| 2,466,537 | DeVore | Apr. 5, 1949 |
| 2,466,784 | Schade | Apr. 12, 1949 |
| 2,538,488 | Volkers | Jan. 16, 1951 |
| 2,552,884 | Cannon | May 15, 1951 |
| 2,579,627 | Tourshou | Dec. 25, 1951 |
| 2,644,105 | Fyler | June 30, 1953 |
| 2,697,798 | Schlesinger | Dec. 21, 1954 |